United States Patent
Seita

(10) Patent No.: US 8,636,428 B2
(45) Date of Patent: Jan. 28, 2014

(54) IMAGING APPARATUS AND METHOD FOR CONTROLLING THE SAME

(75) Inventor: Masato Seita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/360,544

(22) Filed: Jan. 27, 2012

(65) Prior Publication Data

US 2012/0195584 A1    Aug. 2, 2012

(30) Foreign Application Priority Data

Jan. 31, 2011   (JP) .................................. 2011-017777

(51) Int. Cl.
G03B 15/00   (2006.01)
G03B 1/00    (2006.01)
G03B 13/08   (2006.01)
G03B 17/00   (2006.01)

(52) U.S. Cl.
USPC ............ 396/352; 396/374; 396/385; 396/447

(58) Field of Classification Search
USPC .................. 396/374, 385, 447, 352; 359/839
See application file for complete search history.

(56) References Cited

U.S. PATENT DOCUMENTS 5,138,356 A  *  8/1992  Nakamura et al. .............. 396/95

FOREIGN PATENT DOCUMENTS

| JP | 10-39408 A     |   | 2/1998  |
|----|---------------|---|---------|
| JP | 2009-180822 A |   | 8/2009  |
| JP | 2012159581 A  | * | 8/2012  |

OTHER PUBLICATIONS

Machine translation of JP2009-180822 Aug. 2009.*

* cited by examiner

*Primary Examiner* — Christopher Mahoney
(74) *Attorney, Agent, or Firm* — Canon USA Inc IP Division

(57) ABSTRACT

An imaging apparatus includes a diaphragm configured to control an amount of incident light, a variable transmittance and reflectance element configured to reflect a part of the incident light to an optical viewfinder and transmit the remainder of the incident light as imaging light, and a controller configured to increase reflectance of the variable transmittance and reflectance element as a setting value of the diaphragm increases.

7 Claims, 6 Drawing Sheets

FIG. 4
PRIOR ART

RELATIONSHIP BETWEEN DIAPHRAGM OPERATION AND AMOUNT
OF LIGHT INCIDENT ON OPTICAL FINDER IN CONVENTIONAL EXAMPLE

| AMOUNT OF LIGHT TRANSMITTED BY LENS (%) | MIR TRANSMITTANCE | AMOUNT OF LIGHT INCIDENT ON OVF | RATIO OF AMOUNTS OF LIGHT INCIDENT ON OVF | IMAGING PLANE | RATIO OF AMOUNTS OF IMAGING LIGHT |
|---|---|---|---|---|---|
| 100 | 0.50 | 50.0 | 1.00 | 50.0 | 1.0 |
| 90 | 0.50 | 45.0 | 0.90 | 45.0 | 0.9 |
| 80 | 0.50 | 40.0 | 0.80 | 40.0 | 0.8 |
| 70 | 0.50 | 35.0 | 0.70 | 35.0 | 0.7 |
| 60 | 0.50 | 30.0 | 0.60 | 30.0 | 0.6 |
| 50 | 0.50 | 25.0 | 0.50 | 25.0 | 0.5 |
| 40 | 0.50 | 20.0 | 0.40 | 20.0 | 0.4 |
| 30 | 0.50 | 15.0 | 0.30 | 15.0 | 0.3 |
| 20 | 0.50 | 10.0 | 0.20 | 10.0 | 0.2 |

FIG. 6

RELATIONSHIP BETWEEN DIAPHRAGM OPERATION AND AMOUNT
OF LIGHT INCIDENT ON OPTICAL FINDER IN EXEMPLARY EMBODIMENT

| AMOUNT OF LIGHT TRANSMITTED BY LENS (%) | MIR TRANSMITTANCE | AMOUNT OF LIGHT INCIDENT ON OVF | RATIO OF AMOUNTS OF LIGHT INCIDENT ON OVF | IMAGING PLANE | RATIO OF AMOUNTS OF IMAGING LIGHT |
|---|---|---|---|---|---|
| 100 | 0.50 | 50.0 | 1.00 | 50.0 | 1.00 |
| 90 | 0.45 | 49.5 | 0.99 | 40.5 | 0.81 |
| 80 | 0.40 | 48.0 | 0.96 | 32.0 | 0.64 |
| 70 | 0.35 | 45.5 | 0.91 | 24.5 | 0.49 |
| 60 | 0.30 | 42.0 | 0.84 | 18.0 | 0.36 |
| 50 | 0.30 | 35.0 | 0.70 | 15.0 | 0.30 |
| 40 | 0.30 | 28.0 | 0.56 | 12.0 | 0.24 |
| 30 | 0.30 | 21.0 | 0.42 | 9.0 | 0.18 |
| 20 | 0.30 | 14.0 | 0.28 | 6.0 | 0.12 |

IMAGING APPARATUS AND METHOD FOR CONTROLLING THE SAME

BACKGROUND OF THE INVENTION

1. Field of the Invention

The present invention relates to an imaging apparatus such as a single-lens reflex camera, and more particularly to an imaging apparatus including an element transmittance and reflectance of which can be changed.

2. Description of the Related Art

A conventional single-lens reflex camera includes a structure in which a reflection mirror for guiding incident light to an optical viewfinder to confirm an object is arranged in an imaging optical path, and is caused to retreat to focus the incident light onto a film or an image sensor during image capturing. In a digital camera using the image sensor, live view for displaying an object image on a display monitor to confirm an object can be performed so that not only a still image but also a moving image can be recorded in a live view state. However, the reflection mirror is required to retreat from the imaging optical path to achieve the live view state. Therefore, the object cannot be confirmed by the optical viewfinder.

Japanese Patent Application Laid-Open No. 10-39408 discusses a structure in which a reflection mirror is a semi-transparent mirror, and an object image is incident on both an optical viewfinder and an image sensor, respectively, after being separated into an optical viewfinder image and a captured image.

However, an amount of light is divided, so that the optical viewfinder image becomes dark, and the captured image is required to be intensified because it is insufficiently exposed, degrading the object image.

To solve such a problem, Japanese Patent Application Laid-Open No. 2009-180822 discusses a method, using a variable transmittance element as a reflection mirror, for increasing reflectance of the reflection mirror to make an optical viewfinder image easy to see when confirming the optical viewfinder image and increasing transmittance of the reflection mirror when capturing an image to prevent a decrease in an amount of light in the captured image.

In an imaging apparatus such as a single-lens reflex camera, a purpose of changing a diaphragm aperture includes making an amount of exposure of a captured image appropriate and controlling a depth of field.

When the depth of field is optionally set, for example, when an aperture value is set large, to increase the depth of field to widen an in-focus range, the amount of exposure is insufficient. Therefore, a shutter exposure time is lengthened, and sensitivity of the image sensor is increased.

If a diaphragm aperture of a lens is changed in a live view state or during moving image capturing, an optical viewfinder can also observe imaging light even during exposure in a camera using the semi-transparent mirror, as discussed in Japanese Patent Application Laid-Open No. 10-39408. However, change in an amount of light incident on the optical viewfinder occurs due to a diaphragm operation, so that a problem occurs in such a way that a photographer cannot confirm whether an image can be captured under an appropriate exposure condition.

If the variable transmittance element, as discussed in Japanese Patent Application Laid-Open No. 2009-180822, is used as a reflection mirror in a single-lens reflex camera, an amount of light incident on an optical viewfinder can be increased until a still image is captured, and an amount of light incident on an image sensor can be increased only the moment that the still image is captured. In this way, if control is thus performed on an imaging sequence, an uncomfortable feeling to be given to a photographer can be reduced. However, when a diaphragm aperture of a lens is changed in a live view state or during moving image capturing, not only the amount of the light incident on the image sensor but also the amount of light incident on the optical viewfinder changes. Therefore, the photographer who is looking into the optical viewfinder may be made to have an uncomfortable feeling.

More specifically, even if a captured image is appropriately controlled for the aperture value by controlling a shutter and the image sensor, the optical viewfinder image changes depending on the aperture value. If the aperture value is large, the object image becomes dark, so that there is a problem in which the photographer does not easily recognize the object.

SUMMARY OF THE INVENTION

The present invention is directed to an imaging apparatus not only capable of confirming an optical image of an object using an optical viewfinder during live view or moving image capturing but also capable of reducing a change in brightness of the optical image of the object by a diaphragm operation.

According to an aspect of the present invention, an imaging apparatus includes a diaphragm configured to control an amount of incident light, a variable transmittance and reflectance element configured to reflect a part of the incident light to an optical viewfinder and transmit the remainder of the incident light as imaging light, and a controller configured to increase reflectance of the variable transmittance and reflectance element as a setting value of the diaphragm increases.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates numerical values representing the relationship between the diaphragm operation and the amount of light incident on the optical viewfinder in the conventional technique.

FIG. 6 illustrates numerical values representing the relationship between the diaphragm operation and the amount of light incident on the optical viewfinder in the exemplary embodiment.

DESCRIPTION OF THE EMBODIMENTS

Various exemplary embodiments, features, and aspects of the invention will be described in detail below with reference to the drawings.

Figure 1:
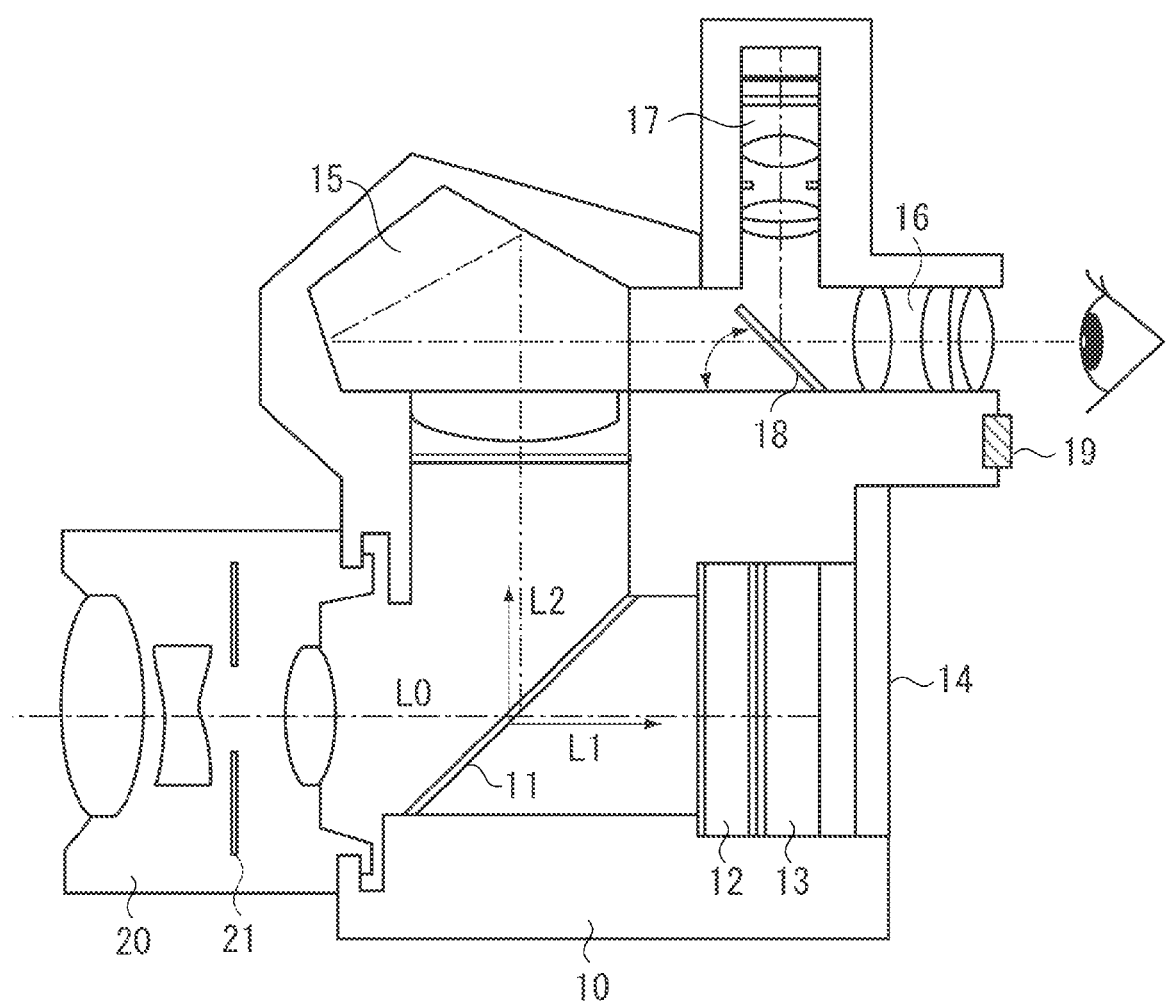
FIG. 1 is a schematic view illustrating the whole configuration of a digital camera according to an exemplary embodiment of the present invention.

An imaging apparatus according to the present invention is applied to a digital camera using a solid-state image sensor of a charge-coupled device (CCD) type or a metal-oxide semiconductor (MOS) type. FIG. 1 is a schematic view illustrating the whole configuration of an exemplary embodiment applied to the digital camera.

In FIG. 1, an imaging lens 20 forms an object image on an image-forming surface, and is detachably attached to a camera body 10. The imaging lens 20 includes a mechanical diaphragm 21 for performing exposure control and a lens driving unit (not illustrated).

A variable transmittance and reflectance element 11 reflects the object image formed by the imaging lens 20 from an optical viewfinder (OVF) 16 while transmitting a part of the object image. The variable transmittance and reflectance element 11 divides the object image into imaging light L1 and viewfinder light L2.

The variable transmittance and reflectance element 11 uses a magnesium-nickel alloy thin film that has high transmittance when transparent for a reflection controllable layer, and has a multilayer structure in which an ion storage layer, a solid electrolyte layer, and a catalyst layer are laminated so that the reflection controllable layer becomes transparent from the side of the solid electrolyte layer. The variable transmittance and reflectance element 11 includes an all-solid-state reflection controllable electrochromic element capable of switching in a short period of time over a wide range. A system control unit (CPU) (not illustrated) serving as a control unit controls reflectance (transmittance) of the variable transmittance and reflectance element 11.

A shutter device 12 performs exposure control when a sill image is captured.

An image sensor 13 captures the object image formed by the imaging lens 20 and converts the captured object image into an electrical signal. An imaging device of a two-dimensional type such as a CCD type or a MOS type is used for the image sensor 13.

A display monitor 14 displays the object image and a captured image.

A pentagonal prism 15 is used as an optical member for reflecting the object image formed on a focusing screen after converting the object image into an erect image.

An optical viewfinder 16 causes the object optical image, which has been reflected after being converted into the erect image by the pentagonal prism 15, to reach the eyes of a photographer.

An EVF switching mirror 18 projects the object image in an electronic viewfinder (EVF) 17 onto the optical viewfinder 16.

A proximity sensor 19 serves as a detection unit for detecting whether the photographer observes the object image using the optical viewfinder 16.

Figure 2:
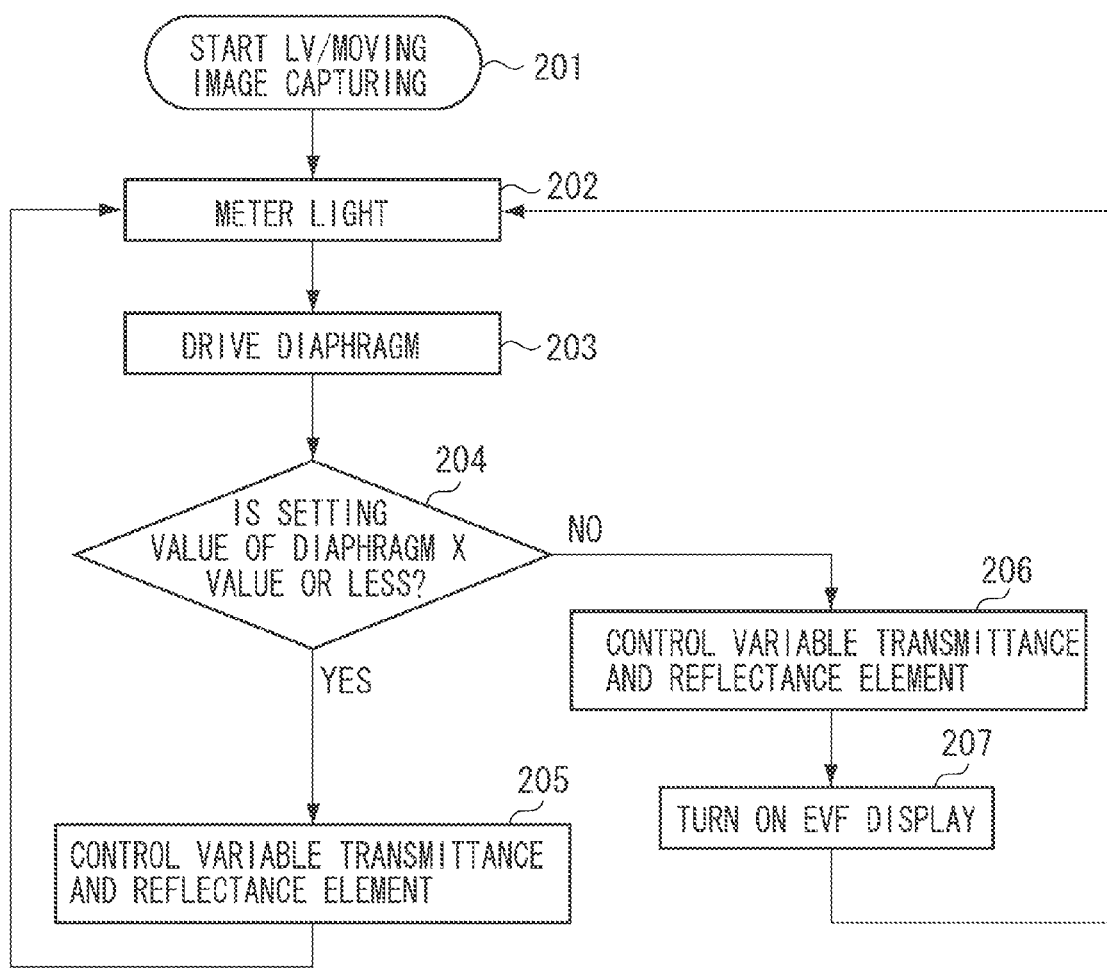
FIG. 2 is a flowchart illustrating an operation in the exemplary embodiment.

FIG. 2 illustrates an imaging sequence during moving image capturing or live view. In step S201, the CPU starts moving image capturing or live view. In step S202, the CPU causes the image sensor 13 to start to meter light. In step S203, the CPU drives the mechanical diaphragm 21. In step S204, the CPU determines whether a setting value of the diaphragm 21 is an X value (predetermined value) or less to determine whether EVF display is performed. If the setting value of the diaphragm 21 is the X value (predetermined value) or less (YES in step S204), the processing proceeds to step S205. In step S205, the CPU controls the variable transmittance and reflectance element 11 depending on the setting value of the diaphragm 21. A routine for the image sensor 13 to meter light again (step S202) is repeated to determine whether an appropriate amount of exposure is obtained under light amount control by the diaphragm 21 and the variable transmittance and reflectance element 11.

If the setting value of the diaphragm 21 is greater than the X value (predetermined value) (NO in step S204), the CPU determines that EVF display is required since an amount of light is insufficient in the optical viewfinder 16. In step S207, the CPU turns on EVF display, to make the photographer easily recognize an object.

In steps S205 and S206, if the setting value of the diaphragm 21 is increased, the variable transmittance and reflectance element 11 is controlled to increase the reflectance thereof. The CPU then controls the variable transmittance and reflectance element 11 to fix the reflectance at a predetermined value. In step S207, the CPU controls an output value of the electronic viewfinder 17 to increase. Thus, the photographer who is looking into the optical viewfinder 16 hardly recognizes a change in brightness of the object image due to the change in the diaphragm aperture, so that a depth of field is easily confirmed. Alternatively, the variable transmittance and reflectance element 11 may be controlled while EVF display is performed.

If the diaphragm 21 is controlled in the vicinity of a boundary of determination whether EVF display is performed, ON-OFF of EVF display is repeated, causing inconvenience to the photographer. Therefore, a determination condition under which EVF display is ON is made different from a determination condition under which EVF display is OFF. If the setting value of the diaphragm 21 is set to the X value or less in the determination condition under which EVF display is ON when beyond the X value, EVF display may be continued until the setting value of the diaphragm 21 reaches a Y value (X>Y) or less. More specifically, unless the setting value of the diaphragm 21 is decreased beyond a hysteresis value (X−Y), EVF display is continued. For example, the X value is set to a determination condition in which an amount of imaging light is one-fourth that when the diaphragm 21 is opened, and the Y value is set to an amount of imaging light is half that when the diaphragm 21 is opened (see FIGS. 5 and 6).

A relationship of an amount of light transmitted by a lens by a diaphragm operation and an amount of imaging light with an amount of light incident on the optical viewfinder 16 will be described below with reference to FIGS. 3 and 5.

Figure 3:
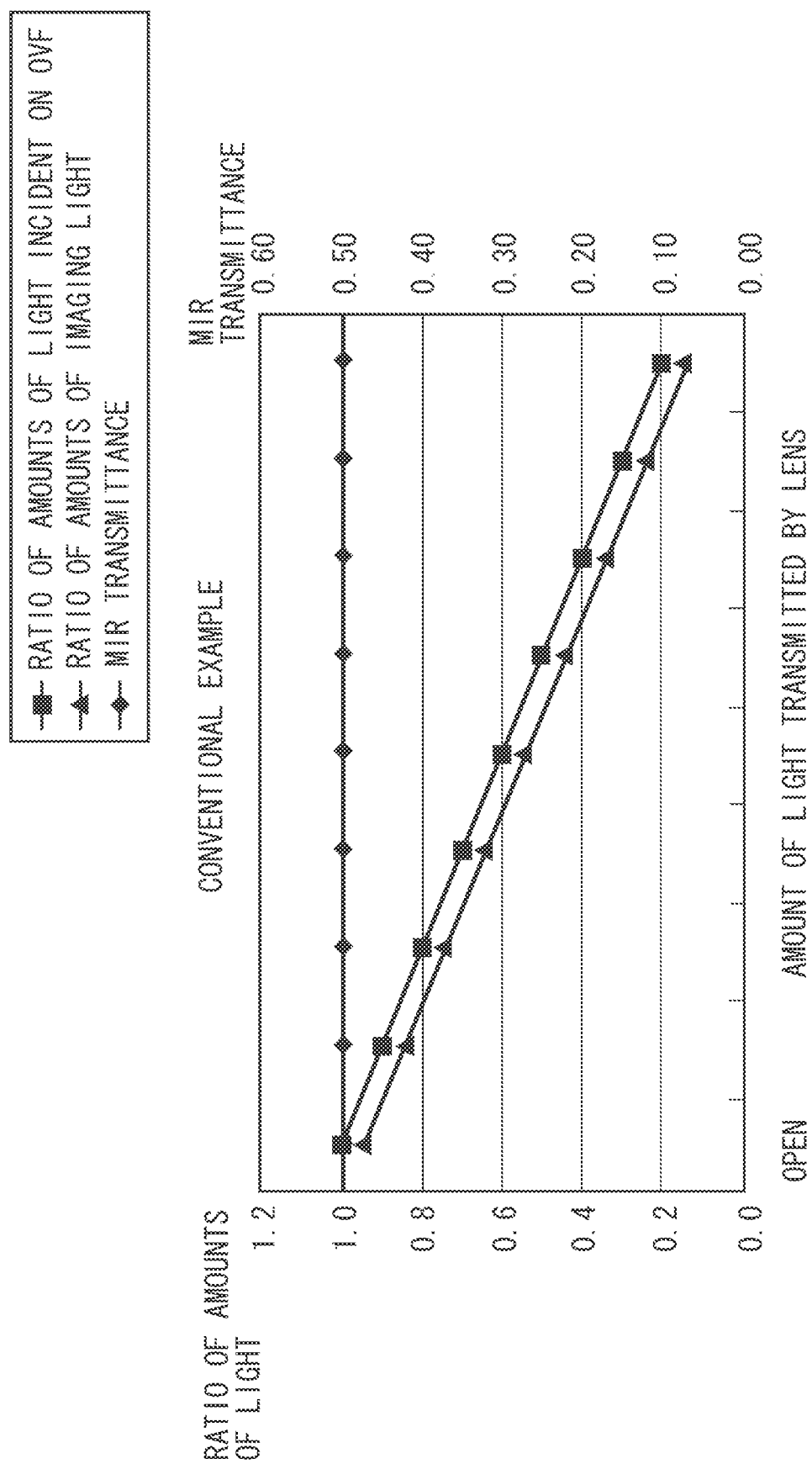
FIG. 3 illustrates a relationship between a diaphragm operation and an amount of light incident on an optical viewfinder in a conventional technique.

FIG. 3 illustrates a relationship of an amount of light transmitted by a lens (a diaphragm operation) and an amount of imaging light with an amount of light incident on the optical viewfinder 16 in a conventional technique. FIG. 4 illustrates their values.

Figure 5:
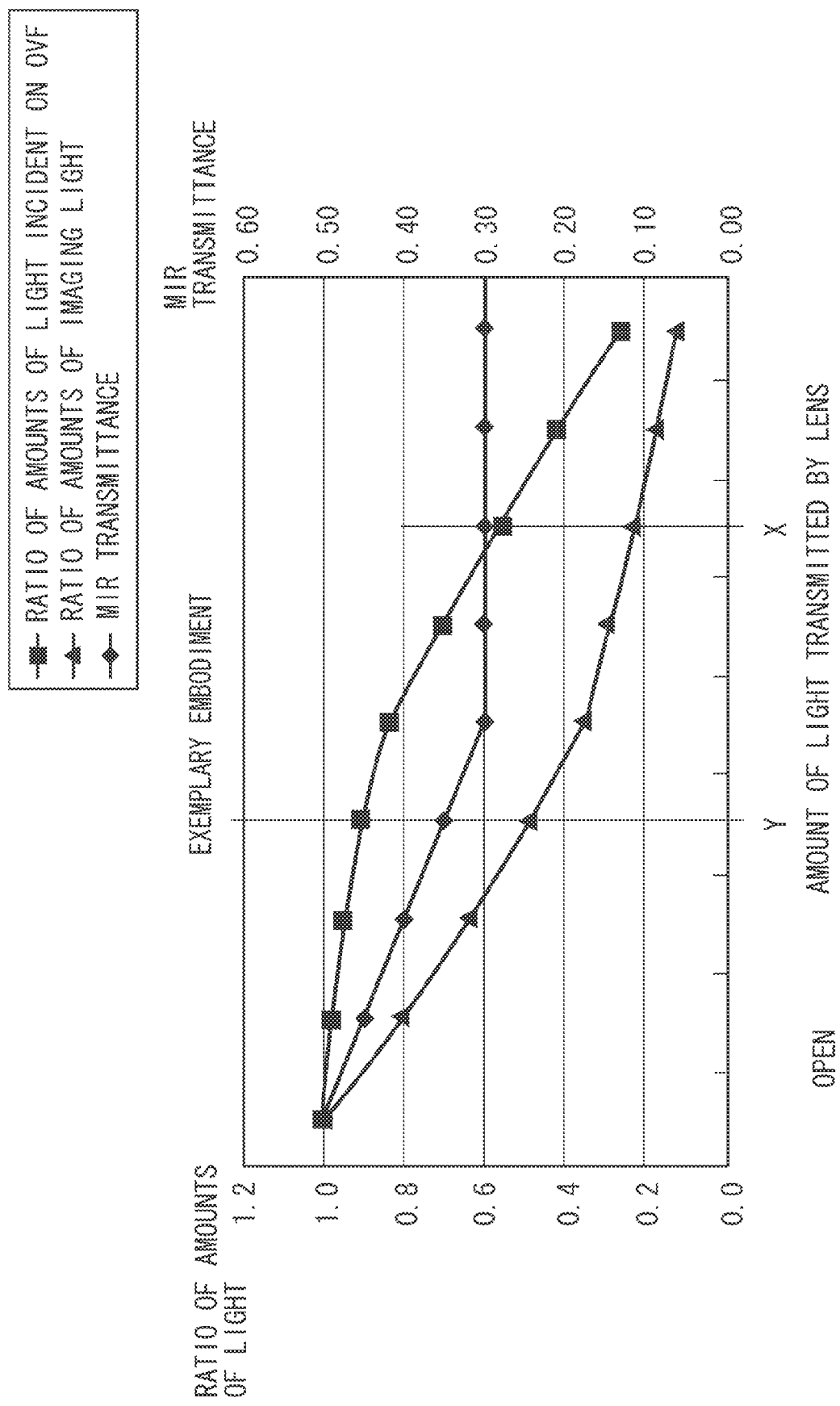
FIG. 5 illustrates a relationship between a diaphragm operation and an amount of light incident on an optical viewfinder in the exemplary embodiment.

FIG. 5 illustrates a relationship of an amount of light transmitted by a lens (a diapragm operation) and an amount of imaging light with an amount of light incident on the optical viewfinder 16 in an exemplary embodiment. FIG. 6 illustrates their values.

A method for calculating each of the values will be described below. The amount of light transmitted by a lens represents an amount of light that changes by the diaphragm 21. FIGS. 4 and 6 illustrate an example where an amount of light is decreased by 10% from a state where the diaphragm 21 is opened.

Medium infrared (MIR) transmittance represents the transmittance of the variable transmittance and reflectance element 11, which is a predetermined value of 0.5 in the conventional technique illustrated in FIG. 4, and satisfies the following a relational expression in the exemplary embodiment illustrated in FIG. 6.

$$\text{MIR transmittance} = 0.5 - (1 - \text{amount of light transmitted by lens})/2$$

where MIR transmittance ≥0.30

An amount of light incident on OVF represents an amount of light incident on the optical viewfinder 16, and satisfies the following relational expression.

Amount of light incident on OVF=transmittance of lens×(1−MIR transmittance)

A ratio of amounts of light incident on OVF represents a ratio of amounts of light incident on the optical viewfinder 16 during diaphragm opening and in each diaphragm state, and satisfies the following relational expression.

Ratio of amounts of light incident on OVF=amount of light incident on OVF in each diaphragm state/amount of light incident on OVF during diaphragm opening An amount of light incident on an imaging plane satisfies the following relational expression.

Amount of light incident on imaging plane=amount of light transmitted by lens×MIR transmittance A ratio of amounts of imaging light represents a ratio of amounts of light incident on the imaging plane during diaphragm opening and in each diaphragm state, and satisfies the following relationship expression:

Ratio of amounts of imaging light=amount of light incident on imaging plane in each diaphragm state/amount of light incident on imaging plane during diaphragm opening In the conventional technique illustrated in FIG. 3, an amount of light transmitted and reflected by a mirror in the variable transmittance and reflectance element 11 is always constant. Therefore, as an aperture value increases, an amount of imaging light decreases, and an amount of light incident on the optical viewfinder 16 also decreases at the same ratio. More specifically, when the amount of imaging light is reduced to half, the amount of light incident on the optical viewfinder 16 is also reduced to half. If the amount of light of an object is sufficient, the object can be recognized and there is no problem, even if the amount of light incident on the optical viewfinder 16 decreases. However, if the object is dark, or diaphragm control is performed to widen a depth of field, a problem arises in which the object is not easily recognized due to a diaphragm operation.

FIG. 4 illustrates a relationship among each value in the conventional technique representing the relationship illustrated in FIG. 3. For easy comparison with the exemplary embodiment, described below, the mirror is a semi-transparent mirror. Even if transmittance and reflectance of the mirror are added, the sum is not actually 100%, causing a loss. However, this does not affect the idea of the invention. In FIG. 4, transmittance toward the image sensor 13 and reflectance toward the optical viewfinder 16 are respectively calculated as 50%.

In the exemplary embodiment illustrated in FIG. 5, a change in an amount of light incident on the optical viewfinder 16 decreases even when an amount of imaging light is controlled to some extent. FIG. 6 illustrates a relationship among each value representing the relationship illustrated in FIG. 5.

A case where an amount of imaging light is reduced to half that in a diaphragm opening condition, for example, will be described. An amount of light by a diaphragm operation may be controlled to 70%, and need not be controlled by one step. The transmittance of the variable transmittance and reflectance element 11 is controlled from 50% to 35% so that the amount of imaging light is reduced to half that in the diaphragm opening condition.

In this case, the reflectance of the variable transmittance and reflectance element 11 increases from 50% to 65%, to compensate for a decrease in amount of light by the diaphragm 21, and the amount of light incident on the optical viewfinder 16 can be ensured to be 91% with respect to that in the diaphragm opening condition.

Further, a case where the amount of imaging light is set to one-fourth that in the diaphragm opening condition (an aperture value at this time is set to X) will be described. In this case, the amount of light according to the diaphragm operation is controlled to 40%, and the transmittance of the variable transmittance and reflectance element 11 is controlled to 30%. At this time, the reflectance of the variable transmittance and reflectance element 11 is changed from 50% to 70%, to compensate for a decrease in amount of light by the diaphragm 21 to some extent, and the amount of light incident on the optical viewfinder 16 is 56% of that in the diaphragm opening condition. If the aperture value becomes greater than the diaphragm operating condition (the X value), an optical viewfinder image becomes dark and is not easily seen. Therefore, EVF display is turned on.

When EVF display is turned on, the EVF switching mirror 18 is moved to the position illustrated in FIG. 1, to perform EVF display of an object image incident on the image sensor 13.

The EVF switching mirror 18 maybe a semi-transparent mirror so that an EVF image and an optical viewfinder image overlap each other when displayed. Alternatively, the EVF switching mirror 18 may be a variable transmittance and reflectance mirror, to increase its transmittance when the optical viewfinder image is seen and to increase its reflectance when the EVF image is seen.

While as a determination condition under which EVF display is turned on, the amount of imaging light is set to one-fourth that when the diaphragm 21 is opened in the present exemplary embodiment, it may be another setting value. Furthermore, it is useful to allow the photographer to be able to perform arbitrary setting.

A method for easily confirming a depth of field when a preview operation is performed (a diaphragm state is confirmed) will be described below.

The proximity sensor 19 illustrated in FIG. 1 detects whether the photographer confirms the object image using the optical viewfinder 16, to maximize the reflectance of the variable transmittance and reflectance element 11 when it is determined that the object image is confirmed using the optical viewfinder 16 and to maximize the transmittance of the variable transmittance and reflectance element 11 when it is determined that the object image is not confirmed using the optical viewfinder 16. More specifically, the object image is easily confirmed by maximizing the amount of light to the optical viewfinder 16 that is being used, so that a diaphragm effect can be appropriately set.

If it is determined that the photographer does not confirm the object image using the optical viewfinder 16, the variable transmittance and reflectance element 11 may not be controlled so that the transmittance and the reflectance thereof are set to predetermined values for the purpose of suppressing power consumption but may be controlled not to display the electronic viewfinder 17 even when the aperture value is greater than the above-mentioned X value.

In the present exemplary embodiment, the brightness of an optical image of an object that has passed through the optical viewfinder 16 is barely changed by a diaphragm operation when the photographer captures an image while looking into the optical viewfinder 16 during live view or moving image capturing. Therefore, a diaphragm effect corresponding to a depth of field can be confirmed so that a diaphragm operation is not erroneously performed.

If the aperture value is great, when the optical viewfinder 16 is insufficient in brightness in the control of the variable transmittance and reflectance element 11, the electronic viewfinder 17 can also project the object image into the optical viewfinder 16, so that an imaging composition can be recognized.

If it is determined that the photographer does not look into the optical viewfinder 16, the variable transmittance and reflectance element 11 is not controlled so that the power consumption can be suppressed.

When the amount of imaging light is decreased, light amount control by the variable transmittance and reflectance element 11 is also added to the diaphragm effect. Therefore, the number of steps controlled by the mechanical diaphragm 21 maybe small. Accordingly, the speed can be increased and noise associated with the diaphragm operation can be reduced, thus reducing the effect that a mechanical operation sound recorded during moving image capturing can haves.

If a preview operation is performed, when it is determined that the photographer confirms the object image using the optical viewfinder 16, the depth of field corresponding to the set aperture value is easily confirmed by maximizing the reflectance of the variable transmittance and reflectance element 11 to increase the amount of light incident on the optical viewfinder 16.

If it is determined that the photographer does not confirm the object image using the optical viewfinder 16, it is determined that the photographer confirms the object image incident on the image sensor 13 by the display monitor 14. By maximizing the transmittance of the variable transmittance and reflectance element 11 to increase the amount of light incident on the image sensor 13, the depth of field corresponding to the aperture value set by the display monitor 14 is easily confirmed.

While the present invention has been described above with respect to an exemplary embodiment, and the example in which the variable transmittance and reflectance element 11 is fixed in the structure of the single-lens reflex camera has been described, the present invention also includes a structure having a mode for operating a variable transmittance and reflectance element 11 to retreat from an imaging optical path during both still image capturing as well as moving image capturing or live view.

The present invention also includes a form having a structure in which a lens is not interchangeable and a camera body and an imaging lens are integrated with each other.

The variable transmittance and reflectance element is not limited to that in the above-described exemplary embodiment. Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-017777 filed Jan. 31, 2011, which is hereby incorporated by reference herein in its entirety.

What is claimed is:

1. An imaging apparatus comprising:
a diaphragm configured to control an amount of incident light;
a variable transmittance and reflectance element configured to reflect a part of the incident light to an optical viewfinder and transmit the remainder of the incident light as imaging light; and
a controller configured to increase reflectance of the variable transmittance and reflectance element as a size of the diaphragm aperture decreases.

2. The imaging apparatus according to claim 1, wherein the controller is configured to increase the reflectance of the variable transmittance and reflectance element as the size of the diaphragm aperture decreases, and then make the reflectance constant.

3. The imaging apparatus according to claim 1, wherein the controller is configured to project an object image in an electronic viewfinder onto the optical viewfinder when the size of the diaphragm aperture is less than a predetermined value.

4. The imaging apparatus according to claim 3, wherein the controller is configured, after projecting the object image in the electronic viewfinder onto the optical viewfinder, to continue to project the object image in the electronic viewfinder onto the optical viewfinder unless the size of the diaphragm aperture is larger beyond a hysteresis value than the predetermined value .

5. The imaging apparatus according to claim 3, further comprising
a detection unit configured to detect whether a photographer observes the object image using the optical viewfinder,
wherein the controller is configured, when the detection unit detects that the photographer does not observe the object image using the optical viewfinder, not to project the object image in the electronic viewfinder onto the optical viewfinder.

6. The imaging apparatus according to claim 1, further comprising
a detection unit configured to detect whether a photographer observes an object image using the optical viewfinder,
wherein the controller is configured, when the detection unit detects that the photographer does not observe the object image using the optical viewfinder, not to control the variable transmittance and reflectance element.

7. The imaging apparatus according to claim 1, further comprising
a detection unit configured to detect whether a photographer observes an object image using the optical viewfinder,
wherein the controller is configured, when the detection unit detects that the photographer observes the object image using the optical viewfinder, to maximize the reflectance of the variable transmittance and reflectance element, and is configured, when the detection unit detects that the photographer does not observe the object image using the optical viewfinder, to maximize transmittance of the variable transmittance and reflectance element when a preview operation is performed.

* * * * *